(12) United States Patent
Haartsen

(10) Patent No.: US 9,046,398 B2
(45) Date of Patent: Jun. 2, 2015

(54) SYSTEM AND METHOD FOR MEASURING FLUID FLOW VELOCITY WITH A HEATER FOR GENERATING A THERMAL MARKER IN RESPONSE TO A TIME-VARYING LEVEL OF POWER

(75) Inventor: Jacob Roger Haartsen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 280 days.

(21) Appl. No.: 13/520,245

(22) PCT Filed: Dec. 29, 2010

(86) PCT No.: PCT/IB2010/056106
§ 371 (c)(1),
(2), (4) Date: Jul. 2, 2012

(87) PCT Pub. No.: WO2011/083393
PCT Pub. Date: Jul. 14, 2011

(65) Prior Publication Data
US 2013/0008225 A1    Jan. 10, 2013

(30) Foreign Application Priority Data

Jan. 6, 2010   (EP) ..................................... 10150160

(51) Int. Cl.
*G01F 1/708*    (2006.01)
*G01F 1/704*    (2006.01)

(52) U.S. Cl.
CPC ............ *G01F 1/7084* (2013.01); *G01F 1/7044* (2013.01)

(58) Field of Classification Search
None
See application file for complete search history.

(56) References Cited

U.S. PATENT DOCUMENTS

| | | | | |
|---|---|---|---|---|
| 5,526,696 | A | * | 6/1996 | Cappi .......................... 73/861.95 |
| 6,058,774 | A |  | 5/2000 | Rengshausen |
| 6,289,746 | B1 |  | 9/2001 | Fu |
| 7,137,298 | B2 |  | 11/2006 | Matsumoto |
| 7,270,015 | B1 | * | 9/2007 | Feller .......................... 73/861.95 |
| 7,424,366 | B2 |  | 9/2008 | Angeleseu |
| 7,647,844 | B2 | * | 1/2010 | Kawanishi et al. ........ 73/861.95 |
| 2008/0282808 | A1 |  | 11/2008 | Trieu |
| 2009/0173166 | A1 |  | 7/2009 | Genosar |

FOREIGN PATENT DOCUMENTS

| | | | |
|---|---|---|---|
| JP | 4188024 | A | 7/1992 |
| JP | 4372865 | A | 12/1992 |
| JP | 5099942 | A | 4/1993 |

(Continued)

*Primary Examiner* — Harshad R Patel

(57) ABSTRACT

The invention relates to a system (102) for measuring a velocity of a fluid (104) flowing through a flow channel (106). The system comprises a heating element (108) configured for generating a thermal marker in the fluid (104) in response to a predetermined time-varying level of power provided to the heating element (108). The system (102) furthermore comprises a sensor arrangement (110) for generating a measurement signal (112) indicative for the velocity of the fluid (104) flowing through the channel (106). Herein, the sensor arrangement (110) is configured for measuring a time series of the primary temperature (114) of the fluid (104) at a predetermined primary location. The primary location and the heating element (108) are situated on an axis having at least a component parallel to the longitudinal axis (119) of the flow channel (106). The measurement signal (112) is based on the maximum value (120) of the time series of time series of the primary temperature (114) in response to the thermal marker.

20 Claims, 4 Drawing Sheets

(56) References Cited

FOREIGN PATENT DOCUMENTS

Figure 1:
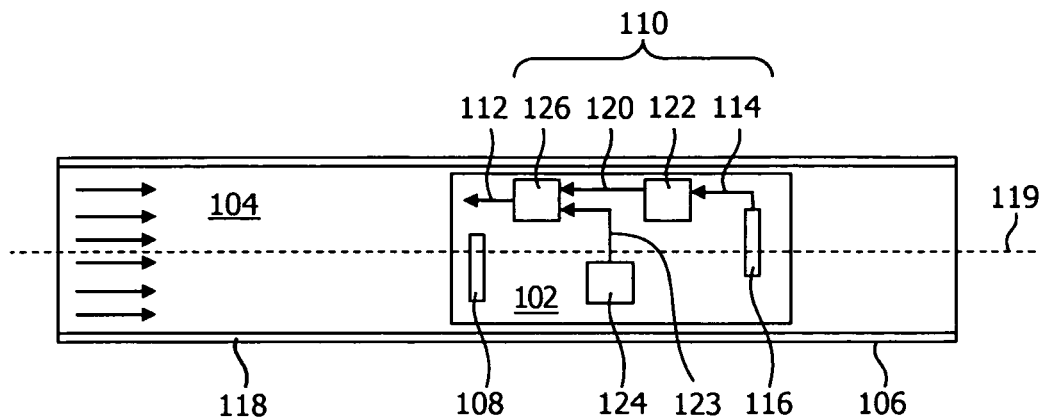

| | | | |
|---|---|---|---|
| JP | 8159834 A | 12/1994 | |
| JP | 2000283991 A | 10/2000 | |
| WO | 9420825 A1 | 9/1994 | |
| WO | 9934221 A2 | 7/1999 | |

* cited by examiner

SYSTEM AND METHOD FOR MEASURING FLUID FLOW VELOCITY WITH A HEATER FOR GENERATING A THERMAL MARKER IN RESPONSE TO A TIME-VARYING LEVEL OF POWER

FIELD OF THE INVENTION

The invention relates to a system for measuring a velocity of a fluid flowing through a flow channel.

BACKGROUND OF THE INVENTION

US-A 2009/0173166 A1 discloses a device for measuring fluid flow rates, comprising a flow channel and at least one mark depositor to introduce at least one mark, more specifically a thermal mark, in the flow channel at an introduction location, thereby causing a variation in the fluid. The device furthermore comprises a plurality of mark detection sensors, such as temperature sensors situated upstream and downstream of the mark depositor, configured for detecting the variation in the fluid caused by the introduction of the at least one mark.

A thermal marker is generated in a substantially discrete manner with respect to time in order to make it observable. However, due to thermal diffusion in the fluid and the flow channel, the thermal marker becomes less discrete over time. Given said thermal diffusion, the thermal marker loses its characteristics that enable the thermal marker to be clearly distinguishable. That is, the mark detection sensors only observe a gradual rather than an abrupt temperature increase when the thermal marker is passing by. Consequently, it is relatively difficult to determine the point in time at which the marker actually crosses the marker detection sensor, thereby causing significant inaccuracy. As a result, the device disclosed in US-A 2009/0173166 A1 is not capable of accurately measuring the velocity at which the fluid is flowing through the flow channel.

SUMMARY OF THE INVENTION

It is an object of the invention to improve the accuracy of measuring the velocity of a fluid flowing through a flow channel.

This object is achieved by the system according to the invention, comprising a heating element configured for generating a thermal marker in the fluid in response to a predetermined time-varying level of power provided to the heating element, and furthermore comprising a sensor arrangement for generating a measurement signal indicative for the velocity of the fluid flowing through the channel, the sensor arrangement being configured for measuring a time series of a primary temperature of the fluid at a predetermined primary location, wherein the primary location and the heating element are situated on an axis having at least a component parallel to the longitudinal axis of the flow channel, and wherein the measurement signal is based on a maximum value of the time series of the primary temperature in response to the thermal marker.

The advantage of the invention is in avoiding the detrimental influence of thermal diffusion on the detectability of the thermal marker by the sensor arrangement. This advantage is obtained by considering the maximum value of the time series of the primary temperature at the primary location.

Since said maximum value is considered the need for determining the point in time at which the thermal marker crosses the primary location, i.e. the point in time at which the primary temperature exceeds some predefined threshold, is effectively circumvented. Determining said maximum value is intrinsically more accurate than determining the point in time at which said time series exceeds a predefined value.

The latter statement can be explained in the following way. As explained before, due to thermal conduction, the primary temperature will be less discrete over time compared to the thermal marker. Presuming the time series of the primary temperature displays a gradual increase and subsequent a gradual decrease in response to the thermal marker, the maximum value of the time series is surrounded by a plateau in which the derivative with respect to time equals or approaches zero. Because of that, the measurement inaccuracy that would be introduced by considering the primary temperature at a point in time relatively near but different from the point in time associated with the maximum value, is negligible. However, the measurement inaccuracy that would be introduced by considering the aforementioned point in time relatively near but different from the point in time associated with the maximum value, is significant.

As a result, the measurement signal's accuracy is not affected by the decrease in detectability of the thermal marker due to thermal diffusion by considering the maximum value of the time series of the primary temperature. Therefore the accuracy of the measurement signal generated by the sensor arrangement is robust regarding dispersion of the thermal marker.

As aforementioned, at nonzero fluid flow velocity heat generated by the heating element, i.e. the thermal marker, is transferred by forced convection superimposed on conduction. Convection based heat transfer follows the bulk motion of the fluid and therefore merely increases the temperature of the fluid downstream from the heating element, whereas conduction of heat is in principle omnidirectional and consequently increases the fluid's temperature both upstream and downstream from the heating element. At zero fluid flow the conduction component of heat transfer will remain present. More specifically, at zero fluid flow, presuming no spatial variation of thermal resistance, conduction based heat transfer causes a symmetric temperature distribution with respect to the heating element. The larger the velocity at which the fluid is flowing through the flow channel, the larger the amount of heat that is transferred from the heating element via forced convection. This statement is formally expressed by the Péclet number, which provides for a dimensionless number relating the advection of a fluid flow, i.e. forced convection, to its rate of thermal diffusion, i.e. conduction. Péclet numbers exceeding 1 are indicative of a situation in which forced convection is predominant over conduction. Given a constant level of power provided to the heating element, an increase in fluid flow velocity causes the temperature asymmetry with respect to the heating element to increase. As a result, whether it is measured downstream or upstream from the heating element, the maximum value of the time series of the primary temperature in response to the thermal marker is a direct measure for fluid flow velocity. If the time series of the primary temperature is being measured downstream, its maximum value will increase with increasing fluid flow velocity. Analogously, if the time series of the primary temperature is being measured upstream, its maximum value will decrease with increasing fluid flow velocity. Since the primary location and the heating element are situated on an axis having at least a component parallel to the longitudinal direction of the flow channel, the thermal marker is guaranteed to cross the primary location. Whereas the time-varying level of power and the primary location are predetermined, the measurement signal allows for appropriate calibration with respect to the velocity of the fluid flowing through the flow channel.

The amount of dispersion of the thermal marker increases with decreasing fluid flow velocity. Therefore, a further advantage of the system according to the invention is in the increase of the range of velocities in which the measurement signal allows for accurately determining the velocity of the fluid flowing through the flow channel. More specifically, the system according to the invention enables accurately determining relatively low levels of fluid flow velocity.

As explained before, the measurement signal is based on the maximum value of the time series of the primary temperature in response to the thermal marker rather than on the point in time at which the temperature of the fluid exceeds some threshold level. Logically, said threshold level would need to be defined at a level exceeding the noise corrupting the measurement signal. The latter requirement implies that the level of power provided to the heating element is to significantly exceed the minimum level of power that is associated with the threshold value. By considering the maximum value of the time series of the primary temperature, the signal to noise ratio is intrinsically optimized. In this text, signal to noise ratio is defined as the ratio of the measurement signal's power and the power of the noise corrupting the measurement signal. Hence, the system according to the invention advantageously enables more accurate measuring the time series of the primary temperature without increasing the level of power provided to the heating element for that purpose. Alternatively, the system according to the invention enables decreasing the amount of power provided to the heating element without sacrificing the signal to noise ratio. Therefore, the system according to the invention advantageously allows for applications in which heating of the fluid is to be restricted; examples are given by but are not limited to intravenous supply of medication to a patient.

In a preferred embodiment of the system according to the invention, the sensor arrangement is configured for measuring a time series of a secondary temperature at a predetermined secondary location not being the primary location, wherein the secondary location and the heating element are situated on a further axis having at least a component parallel to the longitudinal direction of the flow channel, and wherein the measurement signal is based on a numerical difference between the maximum value of the time series of the primary temperature in response to the thermal marker and a maximum value of the time series of the secondary temperature in response to said thermal marker. By basing the measurement signal on the numerical difference between the maximum values of the time series of the primary temperature and the time series of the secondary temperature, a differential measurement is obtained that compensates for ambient temperature fluctuations. As a result, this embodiment is advantageously more robust regarding the disturbing influence due to fluctuations in ambient temperature. Furthermore, in this specific embodiment the measurement signal changes sign in accordance with a change in fluid flow direction. Therefore, this embodiment is furthermore advantageous in that it is capable of registering changes in the direction at which the fluid is flowing through the channel. In addition to that, by registering the maximum values of the times series of the primary temperature and the time series of the secondary temperature, the signal to noise ratio associated with the measurement signal is increased. This increase is obtained for both low and high regimes of fluid flow velocity. Therefore, this embodiment advantageously increases measurement accuracy for a relatively wide range of fluid flow velocities.

In a further preferred embodiment of the system according to the invention, the sensor arrangement is configured for measuring a time series of the secondary temperature at a predetermined secondary location not being the primary location, wherein the secondary location and the heating element are situated on a further axis having at least a component parallel to the longitudinal direction of the flow channel, and wherein the measurement signal is based on a maximum value of the numerical difference between the time series of the primary temperature in response to the thermal marker and the time series of the secondary temperature in response to said thermal marker. By basing the measurement signal on the maximum value of the numerical difference between the time series of the primary temperature and the time series of the secondary temperature, this embodiment further optimizes the measurement signal with respect to its signal to noise ratio. As a result, this embodiment has the advantage of further increasing the measurement accuracy. Furthermore, since the improved signal to noise ratio is obtained for low as well as high fluid flow velocities, this embodiment is furthermore advantageous in that it increases the range of fluid flow velocities that allow for accurate measurement by the system according to the invention.

A further preferred embodiment of the system according to the invention comprises a thermopile for measuring the time series of the primary temperature relative to the time series of the secondary temperature. A thermopile, i.e. a series connection of thermocouples, generates a signal that is proportional to a local temperature gradient. As a result, the need for arithmetic to derive a relative temperature is intrinsically circumvented. Therefore, this embodiment has the advantage that it limits the complexity of the system according to the invention, thereby reducing its costs. A further advantage of this embodiment is in reducing drift with respect to time of the measurement signal.

In a further preferred embodiment of the system according to the invention, the primary and secondary locations are situated on opposite sides of the heating element. Both at upstream and downstream locations relative to the heating element, the fluid will experience an increase in temperature in response to the generation of the thermal marker. For upstream locations, said temperature increase is fully attributable to thermal diffusion. Since in this particular embodiment either the primary or the secondary location is situated downstream from the heating element, the latter increase in temperature is measurable. The latter increase in temperature will increase for decreasing fluid flow velocity. By employing a differential measurement, i.e. by basing the measurement signal on the numerical difference between the time series of the primary temperature and the time series of the secondary temperature, the increase in temperature due to thermal diffusion is at least partially compensated for. Therefore, this embodiment has the advantage of increasing the measurement accuracy particularly for relatively small levels of fluid flow velocity.

In a further preferred embodiment of the system according to the invention, the primary and secondary locations are situated symmetrically with respect to the heating element. Due to the symmetrical configuration with respect to the heating element, no offset will be present in the measurement signal. This offset would either prohibits successful employment in applications in which the direction of the flow is repetitively changing or unknown, or would require compensation for said offset in the event the fluid flow changes direction. Therefore this embodiment has the advantage in that it particularly allows for applications in which the flow repetitively changes direction, or in which no information regarding the direction of flow is available beforehand.

In a further preferred embodiment of the system according to the invention, the primary location is situated at a primary distance from the heating element measured along the longitudinal axis of the flow channel whereas the secondary location is situated at a secondary distance from the heating element measured along the longitudinal axis of the flow channel, wherein the primary and secondary distances are unequal. The inequality of the primary and secondary distances in this specific embodiment, adds an important degree of freedom in the design of the system according to the invention. Namely, by modifying the primary and secondary distances, the sensitivity of the measurement signal may be optimized for a particular direction of fluid flow. Therefore, this embodiment advantageously increases the accuracy of measuring fluid flow velocities in applications in which a particular direction of fluid flow is predominant, or in which direction of fluid flow does not change at all. Such applications are found in, but are not limited to, the intravenous supply of medication by catheters.

In a further preferred embodiment of the system according to the invention, the sensor arrangement is configured for measuring a reference temperature at a reference location, wherein the measurement signal is based on the maximum value of the time series of the primary temperature in response to the thermal marker relative to the reference temperature. By basing the measurement signal on the maximum value of the time series of the primary temperature relative to a time series of reference temperatures, a differential measurement is obtained that compensates for fluctuations in ambient temperature. As a result, this embodiment has the advantage of being more robust regarding the disturbing influence due to ambient temperature fluctuations.

A further preferred embodiment of the system according to the invention comprises a thermopile for measuring the time series of the primary temperature relative to a reference temperature. A thermopile, i.e. a series connection of thermocouples, generates a signal that is proportional to a local temperature gradient. As a result, the need for arithmetic to derive a relative temperature is circumvented. Therefore, this embodiment has the advantage that it limits complexity.

In a practical embodiment of the system according to the invention, the measurement signal is based on a comparison of the time series of the primary temperature with calibration data establishing a relation between the time series of the primary temperature and the velocity of the fluid flowing through the flow channel.

In a further preferred embodiment of the system according to the invention, the calibration data is based on experimental calibration. Herein, an experimental calibration is obtained via experiments with the system according of the invention employing the fluid at hand. Such experiments provide for a mapping between the maximum value of the time series of the primary temperature and fluid flow velocity. By deriving the calibration data from experimental calibration, no inaccuracies due to approximating relevant characteristics, such as the geometry of the flow channel and the thermal behavior of the fluid, are being introduced. Therefore, this embodiment advantageously increases the accuracy of measuring fluid flow velocity.

In a further preferred embodiment of the system according to the invention, the numerical calibration is based on an analytical solution of an equation that establishes a relation between the time series of the primary temperature and the velocity of the fluid flowing through the flow channel. By basing the numerical calibration on said solution, the need for performing either experiments or numerical simulations for a wide range of fluid of flow velocities is effectively prevented from. That is, the solution to the equation provides calibration data for the whole domain of fluid flow velocities for which the equation holds, i.e. for which the equation provides an accurate approximation of reality. Thereby, the solution to the equation performs as a single point of reference addressing a wide range of fluid flow velocities. As a result, this embodiment advantageously enables a time efficient calibration of the system according to the invention.

In a further preferred embodiment of the system according to the invention, the calibration data is based on numerical calibration. Herein, a numerical calibration is obtained via modeling of the system according of the invention, e.g. by finite element methods, accounting for parameters such as the geometry of the flow channel, for the primary location and optionally the secondary location, and for characteristics of the fluid at hand such as density, thermal conductivity and specific heat capacity. Such modeling provides for a mapping between the maximum value of the time series of the primary temperature and fluid flow velocity. By deriving the calibration data from a numerical calibration, the labor intensive and time consuming process of experimentally calibrating the flow channel is circumvented. Therefore this embodiment has the advantage of providing a time efficient calibration of the system according to the invention. In addition to that, numerically calibrating has the advantage that it is capable of effectively calibrating systems if no equation establishing a relation between time series of the primary temperature and fluid flow velocity is derivable, or if said equation proves impossible to solve analytically.

The system according to the invention allows for successful application in situations that are typified by small fluid flow velocity such as the monitoring of intravenous medication delivery, in situations that are marked by medium levels of fluid flow velocity such as juicers and water purifiers as well as in situations that are characterized by high fluid flow velocities such as spirometers employed for measuring lung volume in which airflows that reach up to 1000 l/min are to be measured.

SHORT DESCRIPTION OF THE FIGURES

FIG. 1 schematically displays an embodiment of the system according to the invention comprising a heating element and a sensor arrangement, wherein the measurement signal relates to the maximum value of the time series of the primary temperature.

Figure 2:
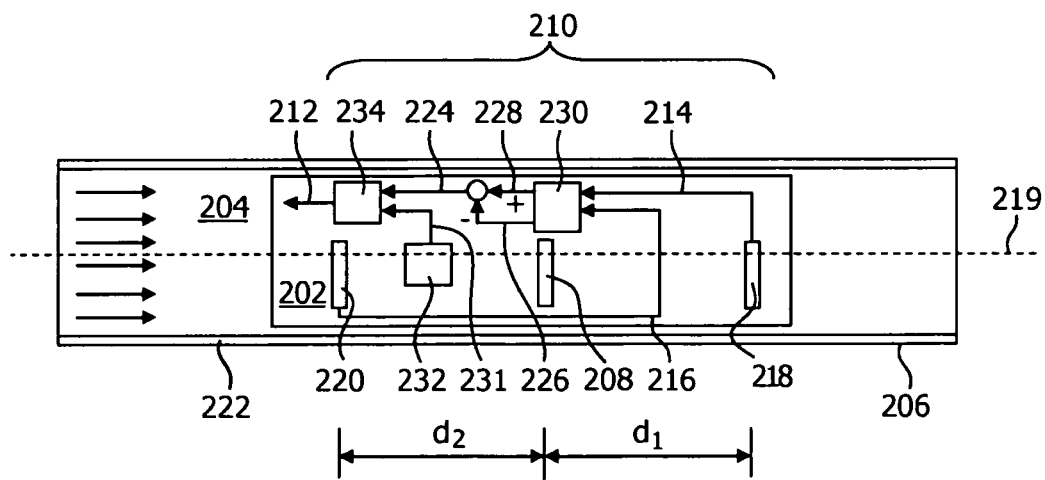

FIG. 2 schematically depicts an embodiment of the system according to the invention configured for measuring a time series of the secondary temperature at a secondary location.

Figure 3:
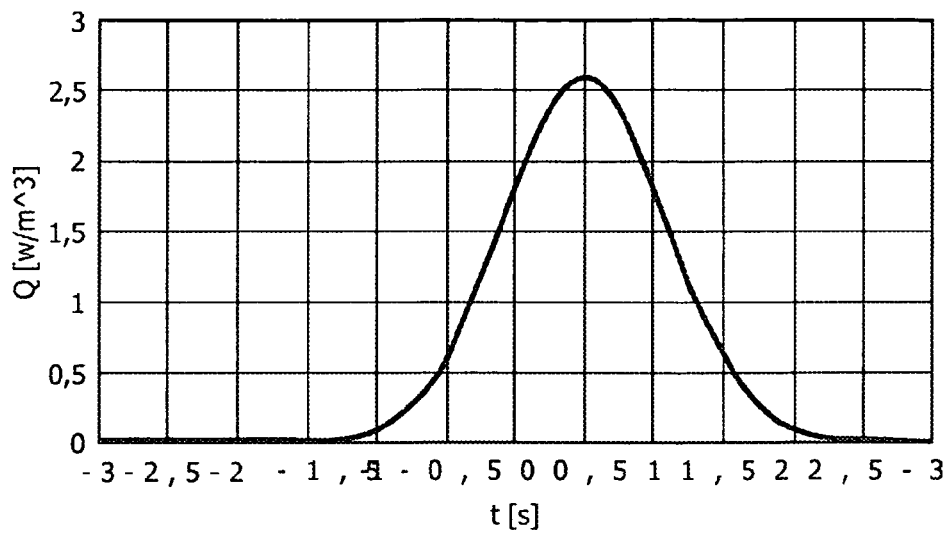
Figure 5:
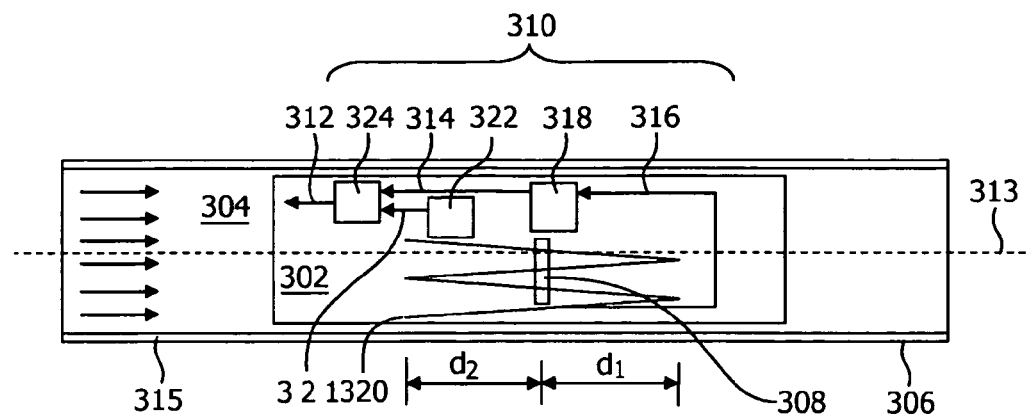

FIG. 3 displays a thermal marker as employed in the numerical calibration of the embodiments depicted in FIG. 2 and FIG. 5.

Figure 4:
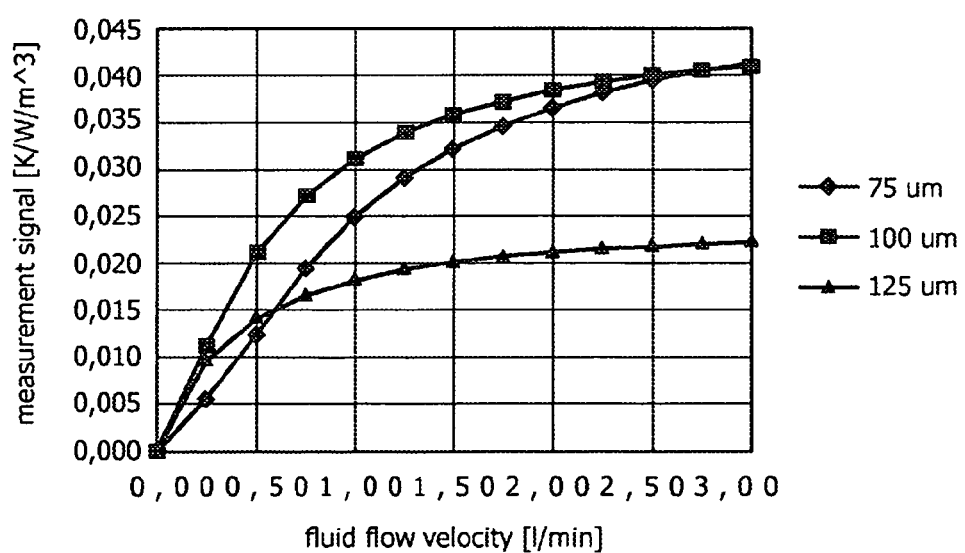

FIG. 4 displays three curves representing calibration data obtained via numerical calibration for the embodiment displayed in FIG. 2.

FIG. 5 schematically displays an embodiment of the system according to the invention wherein the measurement signal relates to the maximum value of the numerical difference between the time series of the primary temperature and the time series of the secondary temperature.

Figure 6:
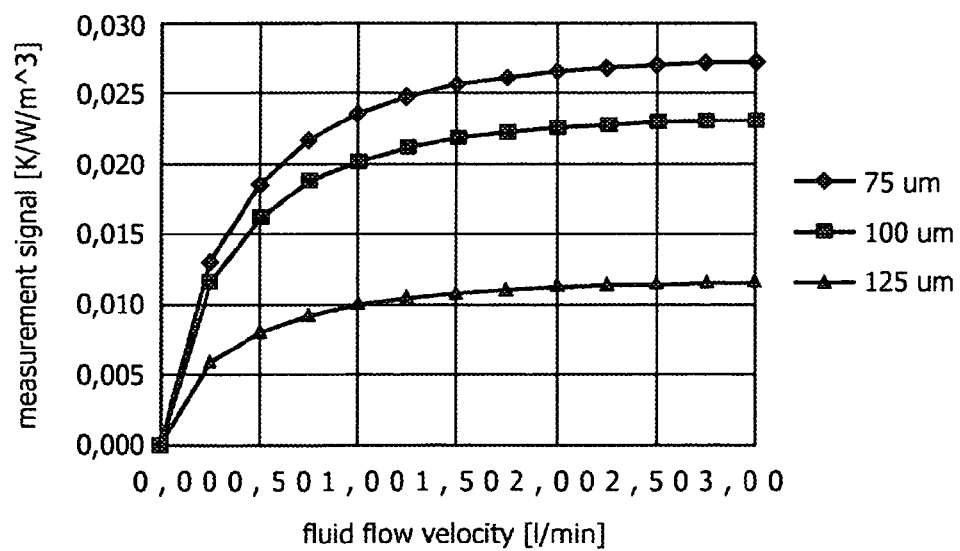

FIG. 6 displays three curves representing calibration data obtained via numerical calibration for the embodiment displayed in FIG. 5.

Figure 7:
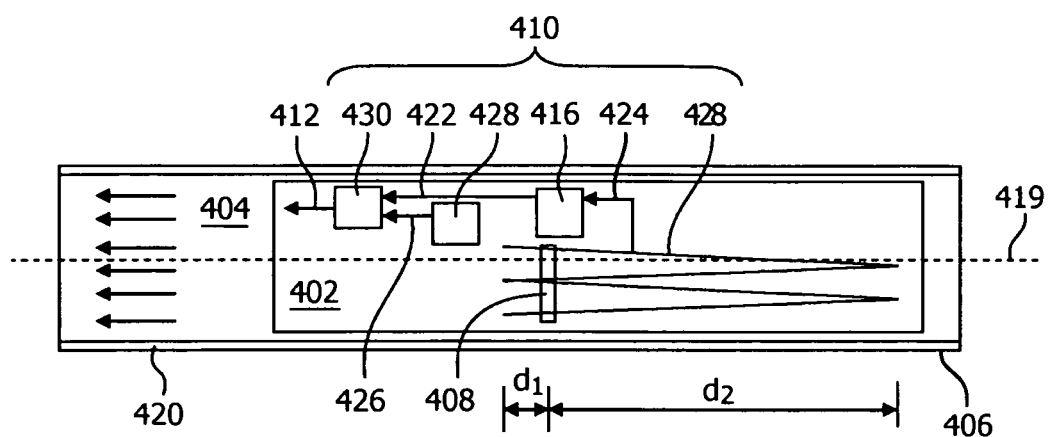

FIG. 7 schematically depicts an embodiment of the system according to the invention configured for measuring a reference temperature at a reference location.

DETAILED DESCRIPTION OF THE EMBODIMENTS

FIG. 1 schematically displays a system 102 for measuring a velocity of a fluid 104 flowing through a flow channel 106.

The system 102 comprises a heating element 108 for generating a thermal marker in the fluid 104. Herein, a predetermined time-varying level of power is supplied to the heating element 108 during operational conditions by a power source known per se. The system 102 furthermore comprises a sensor arrangement 110 for generating a measurement signal 112 indicative for the velocity of the fluid 104 flowing through the flow channel 106.

In this embodiment the sensor arrangement 110 is configured for measuring a time series of the primary temperature 114 of the fluid 104 at a primary location, e.g. by installing a temperature sensor 116 at said primary location. In an embodiment of the system 102, the heating element 108 and the sensor arrangement 110 are installed in a wall 118 of the flow channel 106. Preferably little thermal resistance is present between the heating element 108 and the fluid 104 and between the sensor arrangement 110 and the fluid 104. The primary location and the heating element 108 are situated on an imaginary axis having a component parallel to the longitudinal axis 119 of the flow channel 106.

The measurement signal 112 is based on the maximum value 120 of the time series of the primary temperature 114 in response to the thermal marker. Said maximum value 120 of the time series of the primary temperature 114 is determined by methods known per se implemented in a CPU 122. An example of such a method is an algorithm for determining the point in time at which the derivative of the time series of the primary temperature 114 with respect to time equals or at least approaches zero e.g. 0.001 K/s, 0.01 K/s or 0.1 K/s, presuming a positive value for said derivative initially, and by subsequently determining the value of the time series of the primary temperature at that specific point in time. Alternatively, the maximum value 120 is determined by computing the numerical difference between a data point in the times series of the primary temperature 114 and its preceding data point, wherein the maximum value is characterized by a change of sign of said numerical difference.

In an embodiment of the system 102, the measurement signal 112 is based on a comparison with calibration data 123 stored in a memory 124, via a comparator 126. The calibration data 123 may be made available via a look-up table. In an embodiment of the system 102, the calibration data is based on experimental calibration. That is, the translation of the maximum value of the time series of the primary temperature into the variable of interest, i.e. the velocity at which the fluid 104 is flowing through the flow channel 106, is acquired via measuring the maximum value of the time series of the primary temperature in response to the thermal marker for range of predetermined fluid flow velocities.

Alternatively, the calibration data 123 may be based on analytical calibration. In that particular case the calibration data follows from an analytical solution of an equation that establishes a relation between the time series of the primary temperature 114 and the velocity of the fluid 104 flowing through the flow channel 106.

In the flow channel 106, in principle the full Navier-Stokes equation is to be solved to determine both the fluid flow velocity and the time series of the primary temperature as a function of place and time. However, for a fully developed flow in a circular flow channel, rotational symmetry is obtained with respect to the longitudinal axis. As a result, for a fully developed flow in a circular flow channel having radius R, the following Poiseulle profile having mean axial velocity u can be validly assumed for the velocity $\vec{u}(y)$ in axial direction:

$$\vec{u}(y) = 2\bar{u}\left(1 - \left(\frac{y}{R}\right)^2\right), \quad [1]$$

wherein x is the axial coordinate and wherein y denotes the radial distance with respect to the longitudinal axis 119 of the flow channel 106. In the fluid 104, the energy equation holds as follows:

$$\rho_{fl} c_{p,fl} \frac{\partial T_{fl}}{\partial t} + \nabla \cdot (-k_{fl} \nabla T_{fl}) = -\rho_{fl} c_{p,fl} \vec{u} \cdot \nabla T_{fl}, \quad [2]$$

wherein $\rho_{fl}$ denotes the fluid's density, $C_{p,fl}$ denotes thermal capacity of the fluid at constant pressure, $T_{fl}$ denotes the temperature of the fluid, t denotes time and $k_{fl}$ denotes the fluid's thermal conductivity. Herein, the initial condition for equation [2] is given by:

$$T_{fl}(x,y,t=0) = T_{ambient} \quad [3].$$

That is, the initial temperature of the fluid 104 equals the ambient temperature. The boundary conditions for equation [2] follow from:

$$T_{fl}(x=\pm\infty,y,t) = T_{ambient} \quad [4],$$

wherein x denotes the axial coordinate. Hence, the boundary conditions imply that the temperatures of the fluid 104 at locations remote from the heating element 108 are equal to the ambient temperature as well. In the wall 118 of the flow channel 106, the energy equation is given by:

$$\rho_w c_{p,w} \frac{\partial T_w}{\partial t} + \nabla \cdot (-k_w \nabla T_w) = Q. \quad [5]$$

wherein $\rho_w$ denotes the wall's density, $c_{p,w}$ denotes thermal capacity of the wall at constant pressure, $T_w$ denotes the temperature of the wall, t denotes time and $k_w$ denotes the wall's thermal conductivity. Furthermore, Q [W·m$^{-3}$] is the energy dissipation in the heater, which energy dissipation amounts to generating the thermal marker. Since the heater dimensions are small, the dissipation might mathematically be described using delta functions: Q=P(t)δ(x)δ(y)δ(z), with P(t)[W] the time-dependent power dissipation in the heating element 108.

The initial condition for equation [5] is given by:

$$T_w(x,y,t=0) = T_{ambient} \quad [6].$$

The boundary conditions for equation [5] follow from:

$$T_w(x=\pm\infty,y,t) = T_{ambient} \quad [7].$$

Equation [5] is coupled to equation [2], via the following equations:

$$T_{fl}(x, y = R, t) = T_w(x, y = R, t), \quad [8]$$

and $$k_{fl} \frac{\partial T_{fl}(x, y = R, t)}{\partial y}(x, y = R, t) = k_w \frac{\partial T_w(x, y = R, t)}{\partial y}. \quad [9]$$

Equation [8] states that the temperatures of the fluid 104 and the wall 118 of the flow channel 106 are mutually equal at the interface between said fluid 104 and said wall 118, whereas equation [9] expresses that the heat conduction in a direction perpendicular to the interface is continuous at said interface.

The analytical calibration amounts to solving coupled equations [2] and [5] presuming the above identified initial and boundary conditions, and taking into account the coupling via equations [8] and [9]. The solution to equations [2] and [5] provides both the temperature of the fluid 104 and the velocity at which it is flowing through the flow channel 106 as a function of time and spatial coordinates. The calibration data 123 follows from evaluating said analytical solution for a range of predetermined velocities at the primary location, and subsequently determining the maximum value of the time series of the primary temperature.

FIG. 2 schematically depicts a system 202 for measuring a velocity of a fluid 204 flowing through a flow channel 206. The system 202 comprises a heating element 208 for generating a thermal marker in the fluid 204. Herein, a predetermined time-varying level of power is supplied to the heating element 208 during operational conditions by a power source known per se. The system 202 furthermore comprises a sensor arrangement 210 for generating a measurement signal 212 indicative for the velocity of the fluid 204 flowing through the flow channel 206.

In this embodiment the sensor arrangement 210 is configured for measuring a time series of the primary temperature 214 of the fluid 204 at a primary location, and for measuring a time series of the secondary temperature 216 of the fluid 204 at a secondary location, the secondary location not being the primary location. In an embodiment of the system 202, the time series of the primary temperature 214 and the time series of the secondary temperature 216 are being measured by installing temperature sensors 218 and 220 at the primary and secondary locations. The primary location and the heating element 208 are situated on an imaginary axis which has a component parallel to the longitudinal axis 219 of the flow channel 206. The secondary location and the heating element 208 are situated on a further imaginary axis having a component parallel to the longitudinal axis 219 of the flow channel 206 as well. In this particular embodiment, the primary and secondary locations are situated on opposite sides of the heating element 208 at distances $d_1$ and $d_2$, which distances are measured along the longitudinal axis of the flow channel. In this specific embodiment, the primary and secondary locations are situated symmetrically with respect to the heating element, i.e. $d_1=d_2$. As a result, this embodiment is particularly suited for applications in which the fluid flow regularly changes direction. In a further embodiment of the system 202, $d_1$ and $d_2$ are selected such that $d_1 \neq d_2$ for optimizing the system 202 with respect to a particular predominant direction of fluid flow.

In an embodiment of the system 202, the heating element 208 and the sensor arrangement 210 are installed in a wall 222 of the flow channel 206.

In this particular embodiment, the measurement signal 212 is based on a numerical difference 224 between the maximum value 226 of the time series of the primary temperature 214 in response to the thermal marker and the maximum value 228 of the time series of the secondary temperature 216 in response to said thermal marker. In this embodiment, said maximum values are determined via methods known per se implemented by CPU 230.

In an embodiment of the system 202, the measurement signal 212 is based on a comparison with calibration data 231 stored in a memory 232, via a comparator 234. In an embodiment of the system 202, the calibration data 231 is based on numerical calibration. That is, the translation of the numerical difference between the maximum values of the time series of the primary temperature and the time series of the secondary temperature into fluid flow velocity, is acquired via computing said numerical difference for a range of predetermined fluid flow velocities. In this particular embodiment, the numerical calibration is obtained via numerically solving equations [2] and [5] by way of the Finite Element Method for a range of predetermined fluid flow velocities. In this particular case, 12236 triangular elements were employed for that purpose.

In this particular embodiment, the numerical calibration is performed for the situation in which the fluid is water and the flow channel is manufactured of PVC. This particular numerical calibration presumes water has a thermal conductivity of 0.6 W/mK, a density of 1000 kg/m³ and a heat capacity of 4200 J/kgK. Likewise, the numerical calibration at hand presumes that PVC has a thermal conductivity of 0.1 W/mK, a density of 1760 kg/m³ and a heat capacity of 385 J/kgK. In this specific embodiment, the flow channel 206 is a circular duct having a diameter equal to 2.5 mm and a wall thickness equal to 2.0 mm. The numerical calibration may be employed for any fluid type and any flow channel configuration by accordingly adapting the aforementioned parameter settings.

The numerical calibration presumes that the thermal marker is generated according to the following equation Gaussian distribution:

$$Q = 1.10^{10} e^{-1.0^4 (t-0.5)^2} \quad [10].$$

Here, Q [W·m⁻³] is the energy dissipation in the heater, which energy dissipation amounts to generating the thermal marker. FIG. 3 displays the thermal marker as a function of time. It is to be noted that the latter distribution merely serves as an example; the numerical calibration allows for any type of thermal marker.

The calibration data 231 follow form performing the numerical calibration for a range of fluid flow velocities and by subsequently determining the numerical difference between the corresponding maximum value 226 of the time series of the primary temperature 214 and the corresponding maximum value 228 of the time series of the secondary temperature 216.

Table 1 contains the calibration data so acquired for embodiments of system 202 in which $d_1=d_2=75$ μm, $d_1=d_2=100$ μm and $d_1=d_2=125$ μm. Herein, the calibration data are expressed relative to the maximum value of Q.

FIG. 4 displays three curves representing the calibration data contained in Table 1. That is, a first curve represents the measurement signal 212 as a function of fluid flow velocity if $d_1=d_2=75$ μm, a second curve represents the measurement signal 212 as a function of fluid flow velocity if $d_1=d_2=100$ μm whereas a third curve represents the measurement signal 212 as a function of fluid flow velocity if $d_1=d_2=125$ μm. Clearly, by deliberately selecting $d_1$ and $d_2$, the sensitivity of the system 202 allows for optimization with respect to a particular range of fluid flow velocities. Alternatively, the calibration data may be obtained via experimental calibration or by analytically solving equations [2] and [5].

FIG. 5 schematically depicts a system 302 for measuring a velocity of a fluid 304 flowing through a flow channel 306. The system 302 comprises a heating element 308 for generating a thermal marker in the fluid 304. Herein, a predetermined time-varying level of power is supplied to the heating element 308 during operational conditions by a power source known per se. The system 302 furthermore comprises a sensor arrangement 310 for generating a measurement signal 312 indicative for the velocity of the fluid 304 flowing through the flow channel 306.

TABLE 1

| Fluid flow velocity [l/min] | Measurement signal 212 [K/W/m³] $d_1 = d_2 = 75$ μm | Measurement signal 212 [K/W/m³] $d_1 = d_2 = 100$ μm | Measurement signal 212 [K/W/m³] $d_1 = d_2 = 125$ μm |
|---|---|---|---|
| 0.00 | 0.00000 | 0.00000 | 0.00000 |
| 0.25 | 0.00552 | 0.01128 | 0.00975 |

TABLE 1-continued

| Fluid flow velocity [l/min] | Measurement signal 212 [K/W/m³] $d_1 = d_2 = 75$ μm | Measurement signal 212 [K/W/m³] $d_1 = d_2 = 100$ μm | Measurement signal 212 [K/W/m³] $d_1 = d_2 = 125$ μm |
|---|---|---|---|
| 0.50 | 0.01244 | 0.02117 | 0.01416 |
| 0.75 | 0.01949 | 0.02716 | 0.01669 |
| 1.00 | 0.02498 | 0.03112 | 0.01831 |
| 1.25 | 0.02912 | 0.03387 | 0.01944 |
| 1.50 | 0.03224 | 0.03575 | 0.02024 |
| 1.75 | 0.03469 | 0.03720 | 0.02082 |
| 2.00 | 0.03657 | 0.03838 | 0.02127 |
| 2.25 | 0.03812 | 0.03924 | 0.02159 |
| 2.50 | 0.03941 | 0.04001 | 0.02192 |
| 2.75 | 0.04045 | 0.04049 | 0.02210 |
| 3.00 | 0.04130 | 0.04090 | 0.02224 |

In this embodiment the sensor arrangement 310 is configured for measuring a time series of the primary temperature of the fluid 304 at a primary location, and for measuring a time series of the secondary temperature of the fluid 304 at a secondary location, the secondary location not being the primary location. The primary location and the heating element 308 are situated on an imaginary axis having a component parallel to the longitudinal axis 313 of the flow channel 306. The secondary location and the heating element 308 are situated on a further imaginary axis having a component parallel to the longitudinal axis 313 of the flow channel 306 as well. In this particular embodiment, the primary and secondary locations are situated on opposite sides of the heating element 308 at distances $d_1$ and $d_2$, which distances are measured along the longitudinal axis 313 of the flow channel 306. In this specific embodiment, the primary and secondary locations are situated symmetrically with respect to the heating element, i.e. $d_1 = d_2$. As a result, this embodiment is particularly suited for applications in which the fluid flow regularly changes direction. In a further embodiment of the system 302, $d_1$ and $d_2$ are selected such that $d_1 \ne d_2$ for optimizing the system 302 with respect to a predominant direction of fluid flow.

In an embodiment of the system 302, the heating element 308 and the sensor arrangement 310 are attached to a wall 315 of the flow channel 306.

In this particular embodiment, the measurement signal 312 is based on the maximum value 314 of the numerical difference 316 between the time series of the primary temperature in response to the thermal marker and the time series of the secondary temperature in response to said thermal marker. In this embodiment, said maximum values are determined via methods known per se implemented by CPU 318. In this specific embodiment, a thermopile 320 is comprised, which thermopile 320 is configured for measuring the time series of the primary temperature relative to the time series of the secondary temperature, i.e. to generate the numerical difference 316. In a further embodiment of the system 302, by way of alternative, the time series of the primary temperature and the time series of the secondary temperature are measured by installing temperature sensors at the primary and secondary locations.

In an embodiment of the system 302, the measurement signal 312 is based on a comparison with calibration data 321 stored in a memory 322, via a comparator 324. In an embodiment of the system 302, the calibration data 321 is based on numerical calibration. That is, the translation of the maximum value of the time series of the primary temperature relative to the time series of the secondary temperature into the velocity at which the fluid 304 is flowing through the flow channel 306, is acquired via computing the maximum value of the numerical difference between the time series of the primary temperature and the time series of the secondary temperature in response to the thermal marker for a range of predetermined fluid flow velocities. In this particular embodiment, the numerical calibration is obtained via numerically solving equations [2] and [5] by way of the Finite Element Method for a range of predetermined fluid flow velocities.

In this particular embodiment, the numerical calibration is performed for the situation in which the fluid is water and the flow channel is manufactured of PVC. This particular numerical calibration presumes water has a thermal conductivity of 0.6 W/mK, a density of 1000 kg/m³ and a heat capacity of 4200 J/kgK. Likewise, the numerical calibration at hand presumes that PVC has a thermal conductivity of 0.1 W/mK, a density of 1760 kg/m³ and a heat capacity of 385 J/kgK. In this specific embodiment, the flow channel 206 is a circular duct having a diameter equal to 2.5 mm and a wall thickness equal to 2.0 mm. The numerical calibration may be employed for any fluid type and any flow channel configuration by accordingly adapting the aforementioned parameter settings. The numerical calibration presumes, by way of example, that the thermal marker is generated according to equation [10].

The calibration data 321 follow form performing the numerical calibration for a range of fluid flow velocities and by subsequently determining the numerical difference between the corresponding maximum values of the time series of the primary temperature and the time series of the secondary temperature.

Table 2 contains the calibration data 321 so acquired for embodiments of system 302 in which $d_1 = d_2 = 75$ μm, $d_1 = d_2 = 100$ μm and $d_1 = d_2 = 125$ μm. Herein, the calibration data are expressed relative to the maximum value of Q.

TABLE 2

| Fluid flow velocity [l/min] | Measurement signal 312 [K/W/m³] $d_1 = d_2 = 75$ μm | Measurement signal 312 [K/W/m³] $d_1 = d_2 = 100$ μm | Measurement signal 312 [K/W/m³] $d_1 = d_2 = 125$ μm |
|---|---|---|---|
| 0.00 | 0.00000 | 0.00000 | 0.00000 |
| 0.25 | 0.01299 | 0.01164 | 0.00596 |
| 0.50 | 0.01861 | 0.01625 | 0.00811 |
| 0.75 | 0.02171 | 0.01873 | 0.00929 |
| 1.00 | 0.02361 | 0.02025 | 0.01002 |
| 1.25 | 0.02484 | 0.02123 | 0.01052 |
| 1.50 | 0.02562 | 0.02184 | 0.01087 |
| 1.75 | 0.02617 | 0.02226 | 0.01110 |
| 2.00 | 0.02660 | 0.02258 | 0.01128 |
| 2.25 | 0.02687 | 0.02278 | 0.01140 |
| 2.50 | 0.02710 | 0.02297 | 0.01152 |
| 2.75 | 0.02719 | 0.02303 | 0.01158 |
| 3.00 | 0.02726 | 0.02307 | 0.01162 |

FIG. 6 displays three curves representing the calibration data 321 contained in Table 2. That is, a first curve represents the measurement signal 321 as a function of fluid flow velocity if $d_1 = d_2 = 75$ μm, a second curve represents the measurement signal 321 as a function of fluid flow velocity if $d_1 = d_2 = 100$ μm whereas a third curve represents the measurement signal 321 as a function of fluid flow velocity if $d_1 = d_2 = 125$ μm. Clearly, by deliberately selecting $d_1$ and $d_2$, the sensitivity of the system 302 allows for optimization with respect to a particular range of fluid flow velocities. Alternatively, the calibration data may be obtained via experimental calibration or by analytically solving equations [2] and [5].

FIG. 7 schematically displays a system 402 for measuring a velocity of a fluid 404 flowing through a flow channel 106. The system 402 comprises a heating element 408 for generating a thermal marker in the fluid 404. Herein, a predetermined time-varying level of power is supplied to the heating element 408 during operational conditions by a power source known per se. The system 402 furthermore comprises a sensor arrangement 410 for generating a measurement signal 412 indicative for the velocity of the fluid 404 flowing through the flow channel 406.

In this embodiment the sensor arrangement 410 is configured for measuring a time series of the primary temperature of the fluid 404 at a primary location, and for measuring a reference temperature of the fluid 404 at a reference location, the reference location not being the primary location. The primary location and the heating element 408 are situated on an imaginary axis having a component parallel to the longitudinal axis 419 of the flow channel 406. The reference location and the heating element 408 are situated on a further imaginary axis having a component parallel to the longitudinal axis 419 of the flow channel 406 as well. In this particular embodiment, the primary and reference locations are situated on one and the same side of the heating element 408 at distances $d_1$ and $d_2$, respectively, which distances are measured along the longitudinal axis 419 of the flow channel 406. In this specific embodiment, the reference location is substantially remote from the heating element 408 compared to the primary location, i.e. $d_2 >> d_1$. As a result, the reference temperature is affected by the thermal marker to a significant smaller extend. Thereby, the reference temperature indeed performs as a reference merely taking into account ambient temperature fluctuations.

In an embodiment of the system 402, the heating element 408 and the sensor arrangement 410 are incorporated in a wall 420 of the flow channel 406. Alternatively, the heating element 408 and the sensor arrangement 410 may be attached to the outside of said wall 420.

In this particular embodiment, the measurement signal 412 is based on the maximum value 422 of the numerical difference 424 between the time series of the primary temperature in response to the thermal marker and the reference temperature. In this embodiment, said maximum value is determined via methods known per se, which methods i.e. algorithms are in CPU 426. In this specific embodiment, a thermopile 428 is comprised, which thermopile 428 is configured for measuring the time series of the primary temperature relative to the reference temperature, i.e. to generate the numerical difference 424. In a further embodiment of the system 402, by way of alternative, the time series of the primary temperature and the time series of the secondary temperature are measured by installing temperature sensors at the primary and secondary locations.

In an embodiment of the system 402, the measurement signal 412 is based on a comparison with calibration data 426 stored in a memory 428 via a comparator 430. Said calibration data 426 may be obtained via analytical calibration, i.e. by analytically solving equations [2] and [5], by numerical calibration, i.e. by numerically solving equations [2] and [5], as well as by experimental calibration.

While the invention has been illustrated and described in detail in the drawings and in the foregoing description, the illustrations and the description are to be considered illustrative or exemplary and not restrictive. The invention is not limited to the disclosed embodiments. It is noted that the system according to the invention and all its components can be made by applying processes and materials known per se. In the set of claims and the description the word "comprising" does not exclude other elements and the indefinite article "a" or "an" does not exclude a plurality. Any reference signs in the claims should not be construed as limiting the scope. It is further noted that all possible combinations of features as defined in the set of claims are part of the invention.

The invention claimed is:

1. A system for measuring a velocity of a fluid flowing through a flow channel, comprising:
a heating element configured for generating a thermal marker in the fluid in response to a predetermined time-varying level of power provided to the heating element, and
a sensor arrangement for generating a measurement signal indicative of the velocity of the fluid flowing through the flow channel, the sensor arrangement being configured for measuring a time series of a primary temperature of the fluid at a predetermined primary location, wherein the primary location and the heating element are situated on an axis having at least a component parallel to the longitudinal axis of the flow channel, and wherein the measurement signal is based on a maximum value of said time series of the primary temperature in response to the thermal marker.

2. The system according to claim 1, wherein the sensor arrangement is configured for measuring a time series of a secondary temperature at a predetermined secondary location not being the primary location, wherein the secondary location and the heating element are situated on a further axis having at least a component parallel to the longitudinal axis of the flow channel, and wherein the measurement signal is based on a numerical difference between the maximum value of the time series of the primary temperature in response to the thermal marker and a maximum value of the time series of the secondary temperature in response to said thermal marker.

3. The system according to claim 2, wherein the primary and secondary locations are situated on opposite sides of the heating element.

4. The system according to claim 3, wherein the primary and secondary locations are situated symmetrically with respect to the heating element.

5. The system according to claim 3, wherein the primary location is situated at a primary distance from the heating element measured along the longitudinal axis of the flow channel, wherein the secondary location is situated at a secondary distance from the heating element measured along the longitudinal axis of the flow channel, and wherein the primary and secondary distances are mutually unequal.

6. The system according to claim 1, wherein the sensor arrangement is configured for measuring a time series of a secondary temperature at a predetermined secondary location not being the primary location, wherein the secondary location and the heating element are situated on a further axis having at least a component parallel to the longitudinal axis of the flow channel, and wherein the measurement signal is based on a maximum value of a numerical difference between the time series of the primary temperature in response to the thermal marker and the time series of the secondary temperature in response to said thermal marker.

7. The system according to claim 6, comprising a thermopile for measuring the time series of the primary temperature relative to the secondary temperature.

8. The system according to claim 1, wherein the sensor arrangement is configured for measuring one or more reference temperatures at a reference location, and wherein the measurement signal is based on the maximum value of the time series of the primary temperature in response to the thermal marker relative to the time series of the one or more reference temperatures.

9. The system according to claim 8, comprising a thermopile for measuring the time series of the primary temperature relative to the time series of reference temperature.

10. The system according to claim 1, wherein the measurement signal is based on a comparison of the maximum value of the time series of the primary temperature with calibration data establishing a relation between the maximum value of the time series of the primary temperature and the velocity of the fluid flowing through the flow channel.

11. The system according to claim 10, wherein the calibration data is based on experimental calibration.

12. The system according to claim 10, wherein the calibration data is based on an analytical solution of an equation that establishes a relation between the maximum value of the time series of the primary temperature and the velocity of the fluid flowing through the flow channel.

13. The system according to claim 10, wherein the calibration data is based on numerical calibration.

14. A method of measuring a velocity of a fluid flowing through a flow channel, the method comprising:
    providing a predetermined time-varying level of power provided to the heating element;
    the heating element generating a thermal marker in the fluid in response to the predetermined time-varying level of power provided to the heating element, and
    measuring a time series of a primary temperature of the fluid at a predetermined primary location, wherein the primary location and the heating element are situated on an axis having at least a component parallel to the longitudinal axis of the flow channel;
    determining a maximum value of the time series of the primary temperature in response to the thermal marker; and
    generating a measurement signal indicative of the velocity of the fluid flowing through the flow channel from the maximum value of the time series of the primary temperature in response to the thermal marker.

15. The method of claim 14, wherein generating a measurement signal indicative of the velocity of the fluid flowing through the flow channel from the maximum value of the time series of the primary temperature in response to the thermal marker comprises comparing the maximum value of the time series of the primary temperature in response to the thermal marker to calibration data which establishes a relation between the maximum value of the time series of the primary temperature and the velocity of the fluid flowing through the flow channel.

16. The method of claim 14, further comprising measuring a time series of a secondary temperature at a predetermined secondary location not being the primary location, wherein the secondary location and the heating element are situated on a further axis having at least a component parallel to the longitudinal axis of the flow channel, and wherein the measurement signal is based on a numerical difference between the maximum value of the time series of the primary temperature in response to the thermal marker and a maximum value of the time series of the secondary temperature in response to the thermal marker.

17. The method of claim 16, wherein generating a measurement signal indicative of the velocity of the fluid flowing through the flow channel comprises comparing the numerical difference between the maximum value of the time series of the primary temperature in response to the thermal marker and the maximum value of the time series of the secondary temperature in response to the thermal marker to calibration data which establishes a relation between the difference between the maximum value of the time series of the primary temperature in response to the thermal marker and the maximum value of the time series of the secondary temperature in response to the thermal marker, and the velocity of the fluid flowing through the flow channel.

18. A system for measuring a velocity of a fluid flowing through a flow channel, comprising:
    a heating element configured for generating a thermal marker in the fluid in response to a predetermined time-varying level of power provided to the heating element; and
    a sensor arrangement, comprising:
        a first sensor configured to measure a primary temperature of the fluid over time at a predetermined primary location, wherein the primary location and the heating element are situated on an axis having at least a component parallel to the longitudinal axis of the flow channel, and
        a second sensor configured to measure a secondary temperature of the fluid over time at a predetermined secondary location not being the primary location, wherein the secondary location and the heating element are situated on a further axis having at least a component parallel to the longitudinal axis of the flow channel;
    wherein the sensor arrangement is configured to generate a measurement signal indicative of the velocity of the fluid flowing through the flow channel from one of:
    a numerical difference between a maximum value of the measured primary temperature in response to the thermal marker and a maximum value of the secondary temperature in response to the thermal marker, and
    a maximum value of a numerical difference between the measured primary temperature in response to the thermal marker and the measured secondary temperature in response to the thermal marker.

19. The system of claim 18, wherein generating the measurement signal indicative of the velocity of the fluid flowing through the flow channel comprises comparing the numerical difference between the maximum value of the time series of the primary temperature in response to the thermal marker and the maximum value of the time series of the secondary temperature in response to the thermal marker to calibration data which establishes a relation between the numerical difference between the maximum value of the time series of the primary temperature in response to the thermal marker and the maximum value of the time series of the secondary temperature in response to the thermal marker, and the velocity of the fluid flowing through the flow channel.

20. The system of claim 18, wherein generating the measurement signal indicative of the velocity of the fluid flowing through the flow channel comprises comparing the maximum value of the numerical difference between the measured primary temperature in response to the thermal marker and the measured secondary temperature in response to the thermal marker to calibration data which establishes a relation between the maximum value of the numerical difference between the measured primary temperature in response to the thermal marker and the measured secondary temperature in response to the thermal marker, and the velocity of the fluid flowing through the flow channel.

* * * * *